March 1, 1960  E. R. ZIEGLER  2,926,693
WINDSHIELD WASHER VALVE
Filed Jan. 6, 1958

INVENTOR.
Eugene R. Ziegler
BY
G. H. Strickland
His ATTORNEY

United States Patent Office 2,926,693
Patented Mar. 1, 1960

2,926,693

WINDSHIELD WASHER VALVE

Eugene R. Ziegler, Spencerport, N.Y., assignor to General Motors Corporation, Detroit, Mich., a corporation of Delaware Application January 6, 1958, Serial No. 707,170

7 Claims. (Cl. 137—512.4)

This invention pertains to the washing of windows, and especially to the automatic washing and cleaning of windshields of automobiles.

In the automatic washing and cleaning of windshields, a pump is used to pump cleansing liquid from a reservoir through spray nozzles for discharging the liquid onto the windshield. The presence of detergents and anti-freeze in the cleansing solution lowers its surface tension so much that the ordinary pump valves are unable to prevent leakage from the discharge connection back to the pump and supply reservoir. Consequently, upon re-starting the pump, an appreciable time elapses between the starting of the pump and the delivery of the cleansing liquid whenever leakage occurs during the idle period.

It is an object of this invention to prevent leakage in such a system and to keep the discharge connections full during the idle periods of the pump.

This and other objects are attained in the form shown in the drawings in which the valve head of the pump is provided with a diaphragm-type spring-loaded check valve in series with the pump outlet valve which has sufficient spring loading and suitable surface contact to provide a hermetic seal during the idle periods.

Further objects and advantages of the present invention will be apparent from the following description, reference being had to the accompanying drawings wherein preferred embodiments of the present invention are clearly shown.

Figure 1:
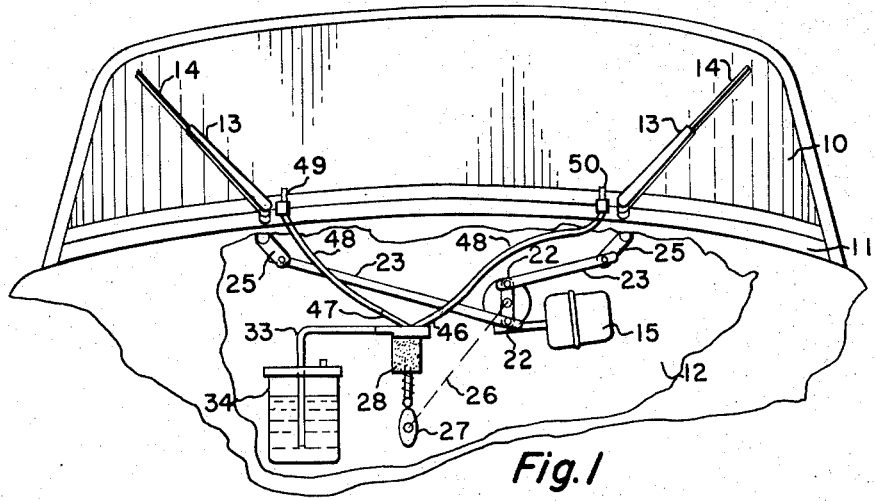
Fig. 1 is a fragmentary view in elevation with certain parts broken away of an automobile having a windshield cleaning system embodying my invention.
Figure 3:
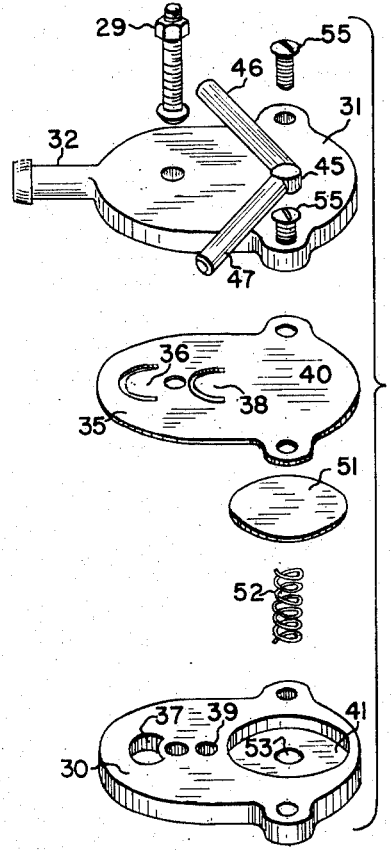
Fig. 3 is an exploded perspective view of the valve head shown in Fig. 2.
Figure 2:
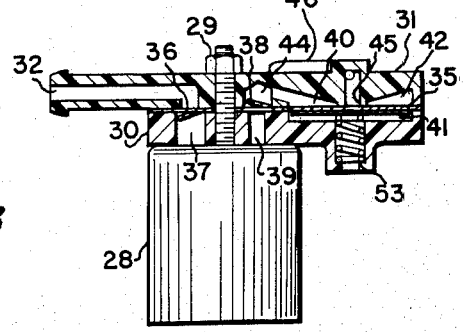
Fig. 2 is an enlarged view in elevation of the pump shown in Fig. 1 with the valve head in section.

Referring now to Fig. 1, the automobile is shown as having a windshield 10 with a cowl 11 and a fire wall 12. The automobile is equipped with a pair of windshield wipers including the arms 13 and the wiper blades 14. A wiper motor 15 through a worm and worm wheel rotates the diametrically-opposed crank pins 22 connected by the links 23 with the wiper cranks 25 connecting with the wiper arms 13.

The shaft which supports the diametrically-opposed crank pins 22 has an extension 26 carrying two-lobed cam 27 for operating of the pump 28. The pump 28 may include any form of pumping mechanism such as a piston or a bellows of natural or synthetic rubber.

Mounted on top of the pump 28 and fastened thereon by the screw 29 are the lower and upper plates 30 and 31 of the valve head. The upper plate 31 includes a supply inlet connection 32 connected by a suction hose connection 33 to a supply reservoir 34 containing the cleansing liquid. The suction connection 33 extends down into the cleansing liquid which is composed of water and antifreeze and a detergent. This provides a liquid having very low surface tension which is difficult to contain and prevent leakage.

Between the upper and lower plates 30 and 31, which may be made of any suitable substantially-hard and rigid plastic, there is provided a thin resilient valve element 35 of suitably compounded elastomeric material such as natural or synthetic rubber or plastic having a pump inlet flap valve, or finger 36 located at the mouth of the suction connection 32 over the pump inlet connection 37 and a pump discharge flap outlet valve, or finger 38 located over the pump discharge passage 39 in the lower plate 30.

The valve element 35 has an imperforate check valve portion 40, which divides the annular chambers 41 and 42 in the lower and upper plates 30 and 31 perpendicular to their common axis. The upper plate 31 has a passage 44 extending from above the flap valve 38 to the annular chamber 42. At the center of the annular chamber 42 is a raised annular mouth 45 of a discharge passage having branch discharge connections 46 and 47 connected by suitable discharge hose connections 48 to the discharge nozzles 49 and 50 located adjacent the bottom of the windshield 10 near the wiper arms 13 for spraying the cleansing liquid onto the windshield 10.

Beneath the check valve portion 40 of the valve element 35 is a thin rigid disk 51 of suitable metal or plastic. This is located in the annular chamber 41 beneath the check valve portion 40. Beneath the disk 51 is a light compression-type coil spring 52 having its lower end resting in the sockets 53 in the bottom wall of the lower plate 30 and having its upper end pressing upwardly against the disk 51 to hold the portion 40 of the valve element 35 against the mouth of the discharge passage 45 with sufficient force to hold the hermetic seal when the pump is idle. However, during the normal operation of the pump 28, the discharge pressure is sufficient to overcome the spring 52 and to depress the check valve portion 40 and allow the liquid to discharge through the discharge passage 45, the branches 46 and 47, the hoses 48 and the nozzles 49 and 50 onto the windshield 10. In addition to the screw 29, the upper and lower plates 31 and 30 are held together by the screws 55 extending through ears on the plates 31 and 30 and the valve element 35 to hold the plates in sealing engagement with the valve element 35 which also serves as a sealing gasket to seal the valve head.

The discharge check valve is, therefore, economically provided within the valve head of the pump by the extension 40 of the valve element 35, the disk 51, the spring 52, and the annular chambers 41 and 42. This prevents leakage of the cleansing fluid from the discharge connections so that they are kept full to provide instant discharge whenever the pump 28 is operated.

The pump may be of the type shown particularly in Fig. 14 of copending application of Schmitz, Turner and Ziegler, Serial No. 674,495 filed July 26, 1957.

While the embodiments of the present invention as herein disclosed constitute a preferred form, it is to be understood that other forms might be adopted.

What is claimed is as follows:

1. Valve mechanism for a pump including, a pair of superposed plates having inlet and outlet passages and inlet and outlet ports formed therein, a resilient valve element disposed between said plates having fingers for opening said inlet and outlet ports and an imperforate portion extending across said outlet passage, and resilient means for normally holding said imperforate portion in sealing engagement with the mouth of said outlet passage.

2. Valve mechanism for a pump including, a pair of superposed plates having inlet and outlet passages and inlet and outlet ports formed therein, a resilient valve element disposed between said plates having fingers movable in opposite directions for opening said inlet and outlet ports and an imperforate portion extending across said outlet passage, and resilient means for normally holding said imperforate portion in sealing engagement with the mouth of said outlet passage.

3. Valve mechanism for a pump including, a first valve plate having inlet and outlet passages, a second superposed valve plate having a pump inlet port and a pump outlet port, and a resilient valve element disposed between said plates having fingers for opening said inlet and outlet ports and an imperforate portion extending across said outlet passage, and resilient means operatively engageable with said imperforate portion for normally holding said imperforate portion in sealing engagement with the mouth of said outlet passage.

4. Valve mechanism for a pump including, an upper valve plate having inlet and outlet passages, a lower valve plate having a pump inlet port and a pump outlet port, a resilient valve element disposed between said plates having fingers movable in opposite directions for opening said inlet and outlet ports, an imperforate portion extending across said outlet passage, a rigid disc disposed beneath said imperforate portion, and resilient means engaging said disc for normally holding said imperforate portion in sealing engagement with the mouth of said outlet passage.

5. Valve mechanism for a pump including, a valve head having inlet and outlet passages and inlet and outlet ports formed therein, a resilient valve element disposed within said valve head having inlet and outlet valve portions associated with said inlet and outlet ports and a check valve portion associated with said outlet passage, and spring means operatively engaging said check valve portion so as to normally close said outlet passage.

6. Valve mechanism for a pump including, a valve head having inlet and outlet passages and inlet and outlet ports formed therein, a resilient valve element disposed within said valve head having inlet and outlet portions associated with said inlet and outlet portions and an imperforate portion extending across said outlet passage, and spring means which normally hold said imperforate portion in sealing engagement with the mouth of said outlet passage.

7. Valve mechanism for a pump including, a valve head having inlet and outlet passages and inlet and outlet ports formed therein, a resilient valve element disposed within said valve head having inlet and outlet valve portions associated with said inlet and outlet ports and an imperforate portion extending across said outlet passage, and spring means operatively engaging said imperforate portion for normally holding said imperforate portion in sealing engagement with the mouth of said outlet passage, said valve head having passage means connecting the outlet port and the outlet passage including an annular chamber circumscribing the outlet passage whereby fluid pressure in said passage means will act upon said imperforate portion to open said outlet passage.

References Cited in the file of this patent

UNITED STATES PATENTS

| | | |
|---|---|---|
| 1,986,831 | Valley | Jan. 8, 1935 |
| 2,142,056 | Horton | Dec. 27, 1938 |
| 2,153,519 | Horton | Apr. 4, 1939 |
| 2,576,198 | Stuart | Nov. 27, 1951 |
| 2,809,589 | Randolph | Oct. 15, 1957 |